United States Patent
Herzl

[11] 3,867,839
[45] Feb. 25, 1975

[54] VORTEX-TYPE FLOWMETER HAVING STRAIN GAUGE SENSOR IN AN ELASTIC SUSPENSION

[75] Inventor: Peter J. Herzl, Morrisville, Pa.

[73] Assignee: Fischer & Porter Company, Warminster, Pa.

[22] Filed: Sept. 25, 1973

[21] Appl. No.: 400,641

[52] U.S. Cl. .......................... 73/194 B, 73/DIG. 4
[51] Int. Cl. ........................... G01f 1/00, G01p 5/8
[58] Field of Search .......... 73/88.5, 194 B; 310/8.5, 310/DIG. 4

[56] References Cited
UNITED STATES PATENTS

| 3,116,639 | 1/1964 | Bird | 73/194 |
|---|---|---|---|
| 3,564,303 | 2/1971 | Geil et al. | 310/8.5 X |
| 3,582,692 | 6/1971 | Palini | 310/8.5 |
| 3,589,185 | 6/1971 | Burgess | 73/194 |
| 3,604,958 | 9/1971 | Palini | 310/8.5 X |
| 3,720,104 | 3/1973 | Zanker | 73/194 |
| 3,791,205 | 2/1974 | Hooker | 73/88.5 |

Primary Examiner—Herbert Goldstein

[57] ABSTRACT

A flowmeter having a conduit forming a passage for the fluid to be measured and an obstacle assembly mounted therein capable of generating strong fluidic oscillations which cause a deflectable section of the assembly to vibrate at a corresponding rate. The vibrations are sensed by a strain gauge to produce a signal whose frequency is proportional to the flow rate of the fluid passing through the conduit. The strain gauge is elastically suspended in a cavity formed within the vibratory section to minimize fatigue and other adverse effects.

8 Claims, 4 Drawing Figures

VORTEX-TYPE FLOWMETER HAVING STRAIN GAUGE SENSOR IN AN ELASTIC SUSPENSION

RELATED APPLICATION

This invention represents an improvement over the invention disclosed in the copending application of Burgess Ser. No. 354,803, filed Apr. 26, 1973, the disclosure of which is incorporated herein by reference.

BACKGROUND OF THE INVENTION

This invention relates generally to a flowmeter of the vortex-shedding type, and more particularly to a strain gauge sensor for such flowmeters.

It is well known that under certain circumstances, the presence of an obstacle in a flow conduit will give rise to periodic vortices. For small Reynolds numbers, the downstream wake is laminar in nature, but at increasing Reynolds numbers, regular vortex patterns are formed. These patterns are known as Karman vortex streets. The frequency at which vortices are shed in a Karman vortex street is a function of flow rate.

An improved form of vortex-type flowmeter is disclosed in Burgess U.S. Pat. No. 3,589,185 wherein the signal derived from the fluid oscillation is relatively strong and stable to afford a favorable signal-to-noise ratio insuring accurate flow-rate information over a broad range. In this meter, the obstacle assembly mounted in the flow conduit is constituted by a block positioned across the conduit with its longitudinal axis at right angles to the direction of fluid flow, a strip being similarly mounted behind the block and being spaced therefrom to define a gap which serves to trap Karman vortices and to strengthen and stabilize the vortex street. This vortex street is sensed to produce a signal whose frequency is proportional to flow rate.

The sensor in the Burgess patent is in the form of a thermistor which is electrically heated by a constant current and is cooled by the fluidic oscillations. The thermistor has a large negative temperature coefficient of resistance, as a consequence of which its internal resistance varies periodically in accordance with the fluidic oscillations in the downstream wake. The electrical signal resulting from the periodic variations in resistance is applied to an indicator calibrated in terms of flow rate.

The use of a thermistor as a sensor has a certain disadvantages. The thermistor has a relatively large mass and exhibits thermal lag, as a consequence of which the amplitude of the signal derived from the thermistor tends to decrease as the signal frequency goes higher. This can be overcome by a signal conditioner adapted to compensate for the thermistor frequency-response curve and to provide a signal whose amplitude is substantially constant throughout the useful frequency range. But such signal conditioners add substantially to the cost of the system.

In the copending Burgess application, above-identified, a vortex type flowmeter is disclosed having an obstacle assembly adapted to generate strong stabilized fluidic oscillations causing a deflectable section of the assembly to vibrate at a corresponding rate. These mechanical vibrations are sensed to produce a signal whose frequency is proportional to the flow rate of the fluid.

In the flowmeter disclosed in this copending application, the mechanical vibrations are sensed by one or more strain gauges mounted on the deflectable section to produce periodic changes in electrical resistance, resulting in a signal whose frequency is proportional to the vibratory rate and hence to the flow rate of the fluid.

A significant advantage of this arrangement resides in the fact that the strain gauge sensor need not be exposed to the fluidic oscillations in order to function, and may be enclosed within the obstacle assembly whereby the sensor is protected from particulate matter or corrosive constituents in the fluid being metered that might otherwise degrade or destroy the sensor.

When the strain gauge is enclosed within the obstacle assembly and is cemented or otherwise bonded thereto, the problem of fatigue arises, for the deflectable section of the assembly is subjected to billions of vibratory cycles during its lifetime, as a result of which the rigid bonding between this element and the gauge may be weakened or degraded.

Also if the coefficient of expansion of the base metal of the deflectable section is not the same as that of the strain gauge, (as is generally the case), a variation in temperature will impart a stress to the gauge and cause a spurious change in output. Moreover with a rigid bond, there is a risk of breaking the bond or overstressing the gauge. And with a rigid suspension, there is a risk of prestressing the gauge in the course of mounting.

SUMMARY OF THE INVENTION

In view of the foregoing, it is the main object of this invention to provide a flowmeter of the vortex type whose obstacle assembly is capable of generating fluidic oscillations causing a deflectable section of the assembly to vibrate at a corresponding rate, the vibrations being sensed by an elastically suspended strain gauge whereby fatigue and other adverse effects are minimized.

More particularly, it is an object of the invention to provide a low-cost, elastically-suspended strain gauge which may be readily installed in the deflectable section of an obstacle assembly to produce a flowmeter sensor having a prolonged fatigue life and good temperature characteristics.

A significant advantage of the invention is that with an elastic suspension, the risk of prestressing the gauge in the course of mounting is obviated, and the risk of overstressing the gauge during operation is markedly reduced.

Briefly stated, these objects are attained in a flowmeter including a flow conduit forming a passage for the fluid to be metered and an obstacle assembly mounted therein which incorporates a vibration sensor. The assembly is constituted by a front body section having a contoured cross section which is preferably uniform throughout the longitudinal axis thereof, the front section being fixedly positioned across the conduit with its longitudinal axis at right angles to the flow axis of the conduit.

Similarly positioned across the conduit behind the front section is a rear section which is spaced from the front section and secured thereto by means of a flexible web to define a gap which serves to trap karman vortices, the rear section having a non-streamlined shape which interferes with and acts to strengthen and stabilize the vortex street. Because the rear section which is cantilevered from the front section by the flexible web is slightly deflectable, it is excited into vibration by the vortices at a rate whose frequency is proportional to the flow rate of the fluid.

The vibratory motion is sensed by a strain gauge which is disposed in a cavity within the cantilever structure to produce a signal indicative of the flow rate, the gauge being elastically suspended therein by means of a potting compound.

OUTLINE OF THE DRAWING

For a better understanding of the invention, as well as other objects and further features thereof, reference is made to the following detailed description to be read in conjunction with the accompanying drawing, wherein.

DESCRIPTION OF THE INVENTION

Figure 1:
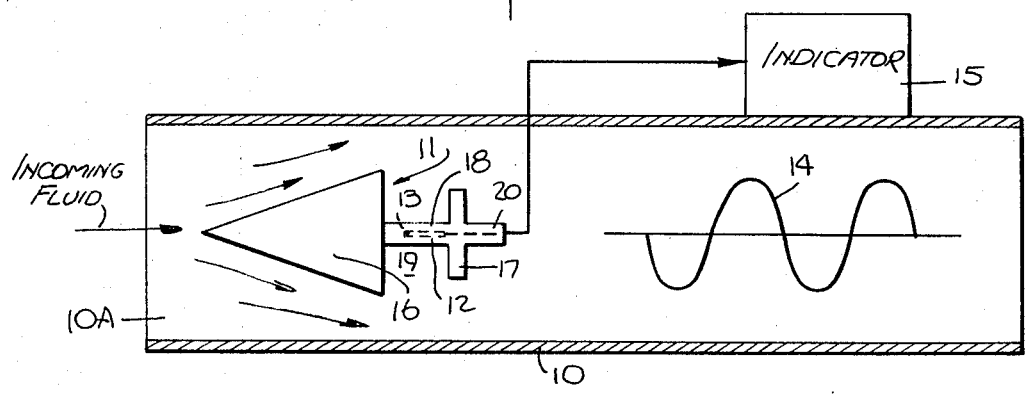
FIG. 1 is a longitudinal section taken through a preferred embodiment of a flowmeter in accordance with the invention.
Figure 2:
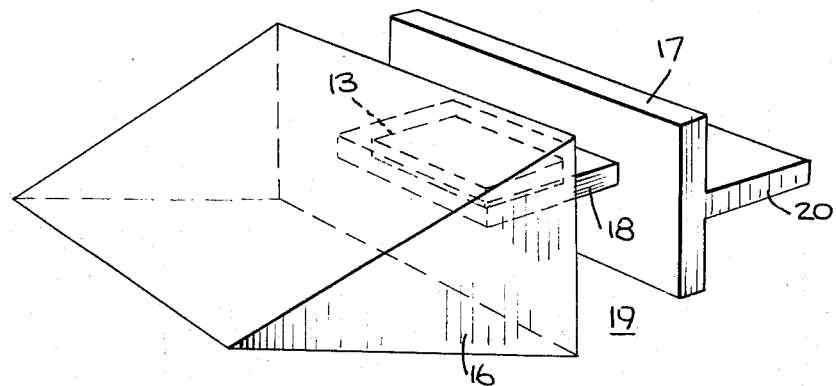
FIG. 2 is a perspective view of the obstacle assembly included in the flowmeter.

Referring now to the drawing and more particularly to FIG. 1, a flowmeter of the vortex-type according to the invention comprises a flow conduit 10, an obstacle assembly generally designated by numeral 11, mounted within the assembly, and a sensor constituted by a strain gauge 12 elastically suspended within a cavity 13 in the assembly.

Conduit 10, which is shown as having a circular cross-section but which may be in other cross-sectional forms, includes an inlet 10A into which a fluid to be metered is introduced. The flow impinges on obstacle assembly 11 which acts to divide the flow around the obstacle, the assembly producing fluidic perturbations in the form of Karman vortex street. The nature of this phenomenon is explained in the text by Schlichtling, "Boundary Layer Theory" (McGraw-Hill 1960).

The resultant fluidic oscillations in the downstream wake, roughly represented by trace line 14, are translated into corresponding mechanical vibrations that are sensed by strain gauge 12 to produce an electrical signal which is applied to a suitable indicator or recorder 15 to provide flow rate readings.

Obstacle assembly 11 is formed by a front section 16 and a rear section 17 mounted behind the front section by a cantilever support constituted by a flexible web 18. Front section 16 is a contoured block having a triangular or delta shaped cross-section which is uniform throughout the longitudinal axis of the block, this axis being perpendicular to the flow axis of the conduit. The ends of the front section are secured to the wall of the conduit whereby the front section is fixedly held within the conduit.

The apex of block 16 faces the incoming fluid, the inclined sides thereof forming leading edges which are swept by the flow of fluid to create vortices. The invention is not limited to obstacle bodies of this shape, for this may take other shapes such as those disclosed in the Burgess U.S. Pat. No. 3,589,185 or in the Bird U.S. Pat. No. 3,116,639.

The rear section 17 takes the form of a non-streamlined body which in this embodiment is in strip form and is maintained by the web 18 is spaced relation to the front section, the plane of the strip being parallel to the flat base of the block. The rear section shape is such as to interfere with the vortex street and the gap 19 created between the front section block and the rear section tends to trap the vortices and to strengthen and stabilize the vortex street produced thereby. While a strip is shown in the wake of the front section shedding block, it is to be understood that the invention encompasses any rear section whose shape and diameter are such as to interfere with the vortex street, as distinguished from a vane or other streamlined body which though acted upon by the street does not interfere therewith.

Because rear section 17 is cantilevered by means of flexible web 18, it is deflectable. The web, through bendable, has sufficient rigidity so as to permit only a slight deflection of the rear section. As a consequence of the fluidic oscillations produced within the conduit, indicated by wave 14, the rear section is excited into vibration at a rate corresponding to the frequency of the oscillations. The natural resonance of the deflectable rear section is such as to be well outside the normal frequency range of the meter whereby mechanical resonance peaks are absent and the amplitude of the vibrating motion accurately reflects the amplitude of the fluidic oscillations. The vibratory motion may be enhanced by securing a tail 20 to rear section 17, the tail extending downstream. In practice, the front and rear sections could be rigidly interconnected and the tail made deflectable relative thereto. The downstream section of the assembly carries out two functions, for this section which interferes with the wake not only stabilizes it to enhance its detectability, but its vibratory motion gives rise to the output signal.

Because the deflectable system is relatively rigid, the total excursion of the rear section is minute even at the highest amplitudes of fluidic oscillation, so that metal fatigue of the supporting web, as a result of the vibrating action, is minimized and failures do not arise after prolonged operation.

It is important to note that the magnitude of deflection is not of primary importance, for the flowrate information is given by the frequency, not the amplitude of vibration. Hence while the deflection magnitude is made extremely small in order to provide an acceptable fatigue life, this does not militate against a readable output of varying frequency.

From the basic Strouhal Number relationship for vortex shedding bodies, the oscillation frequency is approximately equal to 0.22 ($V/D$), where $V$ is the velocity past the body and $D$ is the body width.

For a practical flowmeter of 4 inch size, the value of D might be one inch and that of V 10 feet per second, giving an output frequency of approximately 25 Hz. For continuous operation, this is approximately 700 million cycles per year. In order therefore for the flowmeter to have a prolonged life, it must be designed to experience very small strains and deflections. Typically, the rear body of the obstacle assembly might be designed for a maximum deflection of 0.002 inch at full scale flow. Since the deflection is a function of the dynamic pressure, a 15 to 1 range flowmeter would then require sensing the frequency of a dynamic deflection having an amplitude $0.002/15^2$ or approximately $1 \times 10^{-5}$ inches.

In addition to its fatigue limitations, a large displacement design is also disadvantageous in that flowmeter linearity is dependent on the consistency of the width of the vortex street. Large motions tend to bring about changes in vortex street width with changes in frequency, thereby introducing a non-linearity.

Figure 4:
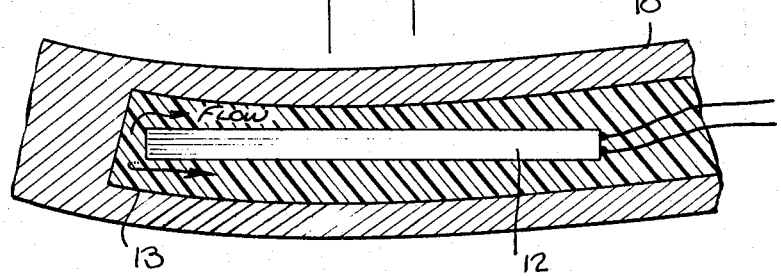
FIG. 4 is the same as FIG. 3, but with the gauge in the stressed state.

Referring now to FIG. 4 there is shown in enlarged and somewhat exaggerated view, the strain gauge 12 which is elastically suspended within a longitudinally-extending cavity 13 formed with a deflectable section of the obstacle assembly which, in this instance, is flexible web 18. It is to be understood that the placement of the strain gauge depends on the configuration of the obstacle assembly and that the strain gauge is placed in the deflectable section of the assembly, wherever that section is located. In other words, this invention is applicable to any form of vortex meter whose obstacle assembly includes a deflectable section that is caused to mechanically vibrate at a frequency corresponding to the frequency of fluidic oscillations produced within the meter.

In practice, use is preferably made of a piezoelectric strain gauge such as a Glennite ceramic strain gauge manufactured by Gulton Industries Inc. of Fullerton, Calif. and described in Bulletin SC-2 published by this company. This gauge consists of polarized piezoelectric plates exhibiting extremely high sensitivities of the order of 50 times that of wire strain gauge.

Figure 3:
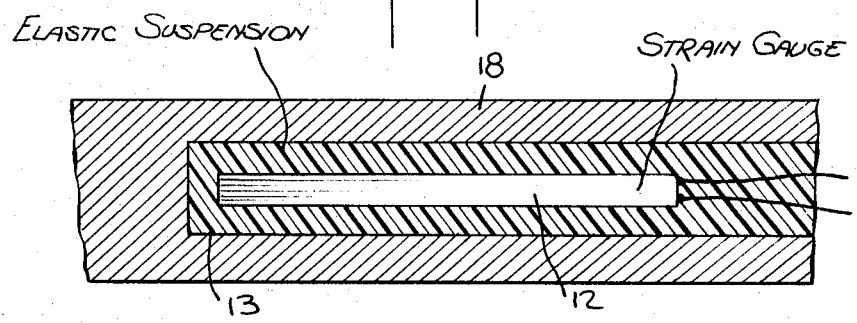
FIG. 3 shows the strain gauge mounted in the deflectable section of the obstacle assembly, the gauge being illustrated in its unstressed state.

Because a piezoelectric strain gauge is self-generating in nature, it requires much less complex instrumentation to develop an acceptable output signal. Normally such strain gauges are bonded to a surface by cement, but in the present invention, the gauge is elastically suspended within cavity 13 which has a rectangular cross section by means of an elastic potting compound such as silicon rubber material of the type used as a bath-tub seal or Dow-Corning 732RTV adhesive/-sealant. As shown in FIG. 3, the plate-like gauge is so placed and suspended within cavity 13 as to provide clearances at all sides, so that no part of the gauge is in physical contact with the wall of the cavity.

As the deflectable section of the obstacle assembly bends, as shown in FIG. 4, the cavity 13 therein also bends, whereas the strain gauge 12 which has the configuration of a flat plate resists bending. As a consequence, the potting compound, which behaves as a viscous fluid, flows around the gauge, as indicated by the arrows in FIG. 4.

The force to create this fluid flow is exerted by strain gauge 12, this force being transferred to the gauge to generate an output signal. Thus the more difficult it is to create fluid flow, the more effective the transfer of force to the gauge. Also the larger the strain gauge plate, the smaller the clearances in the cavity and the more viscous the fluid suspension, the more efficient is the force transfer.

An elastic suspension, as distinguished from a conventional rigid mounting, has an infinite fatigue life. The elastic suspension also minimizes the effect of temperature changes on the output, for even though the gauge has a different temperature coefficient of expansion from the material of the deflectable element in which it is contained, a change in temperature will not significantly stress the gauge. Moreover, since elastic potting is a highly tolerant process, it is very low in cost. Since the flowmeter signal is carried in the A-C information yielded by the strain gauge, the loss of absolute calibration by the elastic gauge suspension does not affect meter performance.

While there has been shown a preferred embodiment of the invention, it will be appreciated that many changes and modifications may be made therein without, however, departing from the essential spirit of the invention.

I claim:

1. A flowmeter of the vortex type comprising:
   A. a flow conduit through which fluid to be measured is conducted;
   B. an obstacle assembly disposed within said conduit and constituted by a front section fixedly mounted across the conduit and contoured to cause flow separation and a downstream vortex street having a periodicity which is a function of flow rate, and a rear section cantilevered behind said front section to define a gap, said rear section being shaped to interfere with said vortex street and to strengthen and stabilize said vortex street, said rear section being slightly deflectable whereby it is excited into vibration by said street; and
   C. means to sense the vibrating motion of said rear section to produce a signal whose frequency is proportional to flow rate, said means being isolated from said fluid and constituted by a strain gauge suspended by an elastomeric material within an enclosed cavity formed in said assembly, the position of said cavity being such as to cause it to bend in accordance with said vibrations to effect a flow of said elastomeric material within the cavity imposing a force on said gauge.

2. A flowmeter, as set forth in claim 1, wherein said strain gauge is of the piezoelectric type.

3. A flowmeter as set forth in claim 2, wherein said piezoelectric strain gauge has a plate-like configuration and is contained in said cavity formed in said assembly, said cavity having a rectangular cross-section to provide clearances on all sides of the gauge.

4. A flowmeter as set forth in claim 3, wherein said elastic suspension is effected by a potting compound filling said cavity.

5. A flowmeter as set forth in claim 4, wherein said potting compound is formed of a silicon rubber compound.

6. A flowmeter as set forth in claim 1 wherein said rear section is cantilevered from the front section by a flexible web having said cavity therein for housing said gauge.

7. A flowmeter of the vortex type comprising an obstacle assembly disposed in a flow conduit through which the fluid to be metered is conducted, said assembly having a deflectable section which is excited into mechanical vibration by a vortex street produced by said assembly, and a strain gauge elastically suspended by elastomeric material within an enclosed cavity formed within said deflectable assembly to detect said mechanical vibration to produce a signal having a corresponding frequency, the position of said cavity being such as to cause it to bend in accordance with said vibration to cause said material to flow within said cavity and to impose a force on said gauge.

8. A flowmeter as set forth in claim 1, wherein said gauge is piezoelectric element.

\* \* \* \* \*